United States Patent
Holtmanns et al.

(10) Patent No.: US 10,425,812 B2
(45) Date of Patent: Sep. 24, 2019

(54) METHOD AND APPARATUS FOR ESTABLISHMENT OF PRIVATE COMMUNICATION BETWEEN DEVICES

(71) Applicant: Provenance Asset Group LLC, Essex, CT (US)

(72) Inventors: Silke Holtmanns, Klaukkala (FI); Sami Kekki, Helsinki (FI)

(73) Assignee: Provenance Asset Group LLC, Pittsford, NY (US)

( * ) Notice: Subject to any disclaimer, the term of this patent is extended or adjusted under 35 U.S.C. 154(b) by 91 days.

(21) Appl. No.: 15/503,678

(22) PCT Filed: Aug. 28, 2014

(86) PCT No.: PCT/FI2014/050657
§ 371 (c)(1),
(2) Date: Feb. 13, 2017

(87) PCT Pub. No.: WO2016/030567
PCT Pub. Date: Mar. 3, 2016

(65) Prior Publication Data
US 2017/0272948 A1 Sep. 21, 2017

(51) Int. Cl.
*H04W 12/06* (2009.01)
*H04W 4/80* (2018.01)
(Continued)

(52) U.S. Cl.
CPC ........ *H04W 12/06* (2013.01); *H04B 1/70735* (2013.01); *H04J 11/0069* (2013.01);
(Continued)

(58) Field of Classification Search
CPC ......... H04W 12/06; H04W 4/21; H04W 4/80; H04W 8/18; H04W 12/02; H04W 12/04;
(Continued)

(56) References Cited

U.S. PATENT DOCUMENTS

| 8,359,643 B2 | 1/2013 | Low et al. |
| 8,447,813 B2 | 5/2013 | Redmond |

(Continued)

FOREIGN PATENT DOCUMENTS

| EP | 2138964 A1 | 12/2009 |
| WO | 2008/076827 A1 | 6/2008 |

(Continued)

OTHER PUBLICATIONS

"Security threats and requirements on MME software package integrity and anti-virus/Comment on contribution from Alcatel-Lucent replaces S3-140181", 3GPP TSG SA Working Group 3 (Security) meeting #74, S3-140242, Agenda: 7.15, Huawei, Jan. 20-24, 2014, 2 pages.

(Continued)

*Primary Examiner* — Oleg Korsak
(74) *Attorney, Agent, or Firm* — Dinsmore & Shohl LLP (57) ABSTRACT

The invention relates to a method and devices for mutual communication between devices, and to computer programs enabling such communication. According to the invention, in a first device is controlled a transmitter module operable in a local radio communications network to transmit a sequence of radio signal pulses representing a predetermined code. In at least one second device a receiver module is scanning said local radio communications network to detect said predetermined code. A contact network of the user of said at least second device is accessed, and the predetermined code is checked in the second device against the user's contact network for a match stored in the network profiles for the contacts. Then a validation key is fetched, that relates to a matching contact found in said contact network, and a connection establishment request containing the validation key is sent over said local radio communications network from the second device to the first device.

(Continued)

Thus the origin of the connection establishment request is validated in the first device.

19 Claims, 2 Drawing Sheets

(51) Int. Cl.

| | | |
|---|---|---|
| *H04B 1/7073* | (2011.01) | |
| *H04J 11/00* | (2006.01) | |
| *H04L 29/08* | (2006.01) | |
| *H04W 4/21* | (2018.01) | |
| *H04L 29/06* | (2006.01) | |
| *H04W 8/18* | (2009.01) | |
| *H04W 12/02* | (2009.01) | |
| *H04W 12/04* | (2009.01) | |
| *H04W 12/10* | (2009.01) | |
| *H04L 12/58* | (2006.01) | |
| *H04W 12/08* | (2009.01) | |

(52) U.S. Cl.
CPC .............. *H04L 29/08* (2013.01); *H04L 51/00* (2013.01); *H04L 51/32* (2013.01); *H04L 63/06* (2013.01); *H04L 63/083* (2013.01); *H04L 63/102* (2013.01); *H04W 4/21* (2018.02); *H04W 4/80* (2018.02); *H04W 8/18* (2013.01); *H04W 12/02* (2013.01); *H04W 12/04* (2013.01); *H04W 12/08* (2013.01); *H04W 12/10* (2013.01)

(58) Field of Classification Search
CPC .. H04W 12/08; H04W 12/10; H04B 1/70735; H04J 11/0069; H04L 29/08; H04L 51/00; H04L 51/32; H04L 63/06; H04L 63/083; H04L 63/102
See application file for complete search history.

(56) References Cited

U.S. PATENT DOCUMENTS

| | | | |
|---|---|---|---|
| 2007/0250700 A1 | 10/2007 | Sidhu et al. | |
| 2008/0123683 A1* | 5/2008 | Cheng ................ | H04M 7/0036 370/464 |
| 2009/0234910 A1* | 9/2009 | Chung ................ | H04L 63/0414 709/203 |
| 2010/0037295 A1 | 2/2010 | Oh et al. | |
| 2011/0307380 A1 | 12/2011 | Ido | |
| 2012/0079086 A1* | 3/2012 | Miettinen .............. | G06Q 10/10 709/222 |
| 2013/0276140 A1* | 10/2013 | Coffing .................. | H04W 4/21 726/27 |

FOREIGN PATENT DOCUMENTS

| | | |
|---|---|---|
| WO | 2010/111510 A2 | 9/2010 |
| WO | 2012/166115 A1 | 12/2012 |

OTHER PUBLICATIONS

"3rd Generation Partnership Project;Technical Specification Group Services and System Aspects;Proximity-based services (ProSe); Stage 2 (Release 12)", 3GPP TS 23.303, V12.0.0, Feb. 2014, pp. 1-53.

"Amateur radio repeater", Wikipedia, Retrieved on Jan. 9, 2017, Webpage available at : https://en.wikipedia.org/wiki/Amateur_radio_repeater.

"3rd Generation Partnership Project;Technical Specification Group Services and System Aspects;Proximity-based services (ProSe); Security Aspects; (Release 12)", 3GPP TS 33.303, V12.0.0, Jun. 2014, pp. 1-32.

"Information technology—Open Systems Interconnection—Basic Reference Model: The Basic Model", ISO/IEC 7498-1, Nov. 15, 1994, 68 pages.

International Search Report and Written Opinion received for corresponding Patent Cooperation Treaty Application No. PCT/FI2014/050657, dated Mar. 12, 2015, 16 pages.

Afonso et al., "Strong authentication on smart wireless devices", Second International Conference on Future Generation Communication Technology, Nov. 12-14, 2013, pp. 137-142.

Shiu et al., "Physical Layer Security in wireless networks : A Tutorial", IEEE Wireless Communications, vol. 18, No. 2, 2011, pp. 66-74.

Alam et al., "Secure Device-to-Device Communication in LTE-A", IEEE Communications Magazine, vol. 52, No. 4, Apr. 2014, pp. 66-73.

"3rd Generation Partnership Project;Technical Specification Group Services and System Aspects;Study on Security issues to support Proximity Services(ProSe) (Release 12)", 3GPP TR 33.833, V1.0.0, Jun. 2014, pp. 1-124.

* cited by examiner

Fig. 4

METHOD AND APPARATUS FOR ESTABLISHMENT OF PRIVATE COMMUNICATION BETWEEN DEVICES

RELATED APPLICATION

This application was originally filed as PCT Application No. PCT/FI2014/050657 filed Aug. 28, 2014.

FIELD OF INVENTION

The invention relates to protocols for establishment of private communication establishment. More specifically, the invention relates to a method and apparatuses for establishing and supporting a private communication between two devices using a radio communications network and a contact network having stored network profiles for individual contacts.

BACKGROUND OF INVENTION

The present on-line dating and social networking services are online dominated and do not easily tie in to a user's day to day interaction with the real world. In many known systems the users spend their time broadcasting and sifting through a myriad of online social protocols, using intelligent devices, rather than spending valuable time encountering friends, relatives or business contacts in person.

A standardization body technically involved with the issue of providing contact between end user of handheld or other intelligent devices is the 3GPP working on a specification on "Proximity based Services" (ProSe) in TS23.303 (Rel-12), TR 33.833 and TS 33.303. The 3GPP specification for this ProSe discovery is based on the E-UTRA radio interface and the use of ProSe Application Codes bound to globally unique ProSe Application IDs in the mobile network operator's Core Network. The ProSe service is a mobile operator focused service and only works between users of different operators, if this pair of operators has a service contract for this service and both provide the technical interfaces.

The security threats identified in the ProSe communication includes at least forged or replayed messages and eavesdropping on the contents of the messages, apart from computer viruses etc. that may infect the devices through software installations and malicious messages.

From the US Patent Application Publication No. 20130276140 is known a system for electronically aided exchange of information between social and business contacts using controlled access technologies with tokens of authentication to control access to protected information in a contact's profile. Authentication tokens are used provide relatively quick access to secured data and other resources in a service provider's system, providing credentials (e.g., username and password) for tokens to be preloaded to client's device. A digital transaction token may be configured to provide proof of the client's authorization for a social or business contact or to a business premise, such as an event organizer, club house, and/or hospital, to access the corresponding client's profile.

A transaction token may be embedded in a profile page code provided in a profile response. When a profile page code is received and loaded by the browser application, the transaction token is loaded by the browser as well. Thus, the transaction token may be maintained in the code of the profile page rather than be delivered separately. Thus a sender's and receiver's wireless devices may exchange transaction tokens in a local wireless protocol, and the wireless devices are coupled together over a second wireless network. The devices may communicate with a server via cable or other physical connection to a PC, or through any form of wireless connection, such as Bluetooth, Wi-Fi or WLAN (802.11), which may relay the tokens or other information either directly or through some intermediary (e.g., a cellular network) to the server. The remaining problem still being that a unique identifier (ID) is needed, which may be based on the mobile device, the name, address, billing information (if applicable), username, profile information, photo, preferences and names of friends.

If two devices want to initiate and conduct direct communication with technology available in prior art, there are at least the following issues:
- a device or other identity information is broadcasted which allows user tracking,
- the broadcast is done via a network operator, which need to support this somehow,
- broad support from operating systems is required,
- global approaches to establish a proximity security association usually would require a global Public Key Infrastructure for user authentication, which is quite expensive. Alternatively, it could be shared key based, but due to the number of combinations, there would be a very, very large number of symmetric keys.

The identifications provided may be, apart from any device ID information, network id's like the SSID identity for WLAN, Bluetooth Identity, or a social network authentication system like the Facebook Single Sign On.

There is thus a need for a globally working system to set up a secure local communication, but while preserving the integrity and location privacy of the users by not broadcasting the device identity. This means in practice that a solution must be found that is not built around geographically local and competing operators.

SUMMARY OF THE INVENTION

The invention brings together simple radio interface physical layer L1 functionality, sequence codes and contact such as social networks to be used in combination, in order to establish a secure local communication with the users privacy preserved and with no user traceability risk. The inventive method provides a simple and robust way of announcing the availability to the friends and for discovering buddies, that relies on short range communication and social network public profile information.

There is no need to involve mobile network operators, but only requires support from a social network service, of which there are abundant to choose between. This makes the inventive method privacy preserving compared to approaches where device, identity or communications network ID is required.

According to the inventive method, in a first device is controlled a transmitter module operable in a local radio communications network to transmit a sequence of radio signal pulses representing a predetermined code.

In at least one second device a receiver module is scanning said local radio communications network to detect said predetermined code. A contact network of the user of said at least second device is accessed, and the predetermined code is checked in the second device against the user's contact network for a match stored in the network profiles for the contacts. Then a validation key is fetched, that relates to a matching contact found in said contact network, and a connection establishment request containing the validation key is sent over said local radio communications network from the second device to the first device. Thus the origin of the connection establishment request is validated in the first device.

The validation key may be stored in the profile of the contact, or it may be ad hoc-generated. The key may be used to send a key identifier to the first device, or one may put in some parameters in the connection establishment request so that the recipient at the first device can generate the same key and validate the connection establishment request.

The local radio communications network used to transmit and receive the sequence of pulses radio signal representing the predetermined code may be the same or different from the preferred communications network, over which the direct communication is established.

According to one embodiment, the predetermined code is the Morse code. However, the invention is by no means restricted to the Morse code. That code was optimized for transmitting English language characters over a telegraph line; such considerations are largely obsolete in today's world and other priorities may suggest a different coding system.

The predetermined code may according to one embodiment be generated by altering the output signal of said transmitter module between on and off states, in a manner that represents the predetermined code, or it may be generated by modulating the output signal of the said transmitter, and as e.g. the Morse code is a binary code, preferably and simply by amplitude or frequency modulation.

The contact network may be a centralized service for personal information storage and distribution, i.e. a social media network. Suitable social media networks are e.g. Facebook®, Twitter® or Instagram®. The main requirement is that users may store profiles of themselves that are at least to some extent accessible by others, and that may contain a public key with which the connection between user can be validated.

The local radio communications network used may be one or more of the following: Bluetooth, WLAN, WiFi Direct, or LTE D2D. Other systems may exist and will become standardized in the future. It is essential for the purposes of the invention that a direct communication channel is available, i.e. without operator or other authority involvement.

According to further embodiments, the preferred communications network may be the internet or a cellular network, or Bluetooth, WLAN, WiFi Direct, or LTE D2D.

A user may store codes for his or her network contacts in advance, whereby only such stored codes may be matched and further processed. Furthermore, the network profiles for said network contacts may contain stored beacon information indicating time when a contact will transmit his or her predetermined code. This will allow the listening user to time the sending of connection establishment requests, e.g. if the listening user want to connect as soon as the transmitting network contact is available.

An inventive transmitting apparatus comprises at least one processing core, at least one memory including computer program code and at least one communication transceiver module operable in at least one local radio communications network. The processing core, the memory and the computer program code are being configured to cause the apparatus at least to:
control a radio transmitter in said transceiver module to transmit a sequence of radio signal pulses representing a predetermined code identifying a user of said apparatus over a local radio communications network to listening external devices;
receive from at least one listening external device with a receiver in said transceiver module a connection establishment request containing a validation key from a user of said listening external device, wherein the validation key is related to the user profile of the user of said apparatus in a contact network of the user of said external device, and is matched with said sent predetermined code;
validate the origin of said connection establishment request and opening a direct communications channel to said at least one listening external device in a preferred radio communications network.

An inventive listening apparatus comprises at least one processing core, at least one memory including computer program code and at least one communication transceiver module operable in at least one local radio communications network. The processing core, memory and the computer program code being configured to cause the apparatus at least to:
scan with a receiver in said communication transceiver module over a local radio communications network for sequence of radio signal pulses representing a predetermined code;
receive from at least one transmitting external device a sequence of radio signal pulses representing said predetermined code identifying a user of said transmitting external device;
match the identity of said user encoded in said received predetermined code with a contact identity stored in said apparatus in a user profile of a contact network;
fetch a validation key related to said user of said transmitting external device and sending a connection establishment request to said transmitting external device using said validation key;
receive a validation for said connection establishment request from said transmitting external device and opening a direct communications channel to said transmitting external device in a preferred communications network.

It is to be noted that the expressions "transmitting apparatus", "transmitting external device", "listening external device" and "listening apparatus" are notions used for the sake of clarity. Both the described devices may be transceivers of equal capacity of two-way communications over selected networks, but here the notions "transmitting apparatus" and "transmitting external device" are used to describe the device of the user that is sending out his or her code for others to scan for and connect, while the notions "listening apparatus" and "listening external device" are used for devices enabled to scan for such codes.

The invention also related to a non-transitory computer readable medium having stored thereon a set of computer readable instructions that, when executed by at least one processor, cause an apparatus to at least:
controlling a radio transmitter to transmit a sequence of radio signal pulses representing a predetermined code identifying a user of said apparatus over a local radio communications network to listening external devices;
receiving from at least one listening external device with a receiver a connection establishment request containing a validation key from a user of said listening external device, wherein the validation key is related to the user profile of the user of said apparatus in a contact network of the user of said listening external device, and is matched with said sent predetermined code;
validating the origin of said connection establishment request and opening a direct communications channel to said at least one listening external device in a preferred radio communications network.

Finally, the invention also relates to a non-transitory computer readable medium having stored thereon a set of computer readable instructions that, when executed by at least one processor, cause an apparatus to at least:

scanning with a receiver over a local radio communications network for sequence of radio signal pulses representing a predetermined code;

receiving from at least one transmitting external device a sequence of radio signal pulses representing said predetermined code identifying a user of said transmitting external device;

matching the identity of a user encoded in said received predetermined code with a contact identity stored in said apparatus in a user profile of a contact network;

fetching a validation key related to said user of said transmitting external device and sending a connection establishment request to said transmitting external device using said validation key;

receiving a validation for said connection establishment request from said transmitting external device and opening a direct communications channel to said transmitting external device in a preferred communications network.

The embodiments of the invention relating to non-transitory computer readable media may be computer programs in the form of API's (Application Programming Interface), which when run by a processor core in e.g. a mobile device, will enable direct access from an application to a short range radio module, giving the application control over a transceiver of the local radio communications network for the purposes of the invention.

INDUSTRIAL APPLICABILITY

The invention is industrially applicable in telecommunications industry, and may easily find useful applications also in entertainment and game industries.

DETAILED DESCRIPTION OF EXAMPLE EMBODIMENTS

Figure 1:
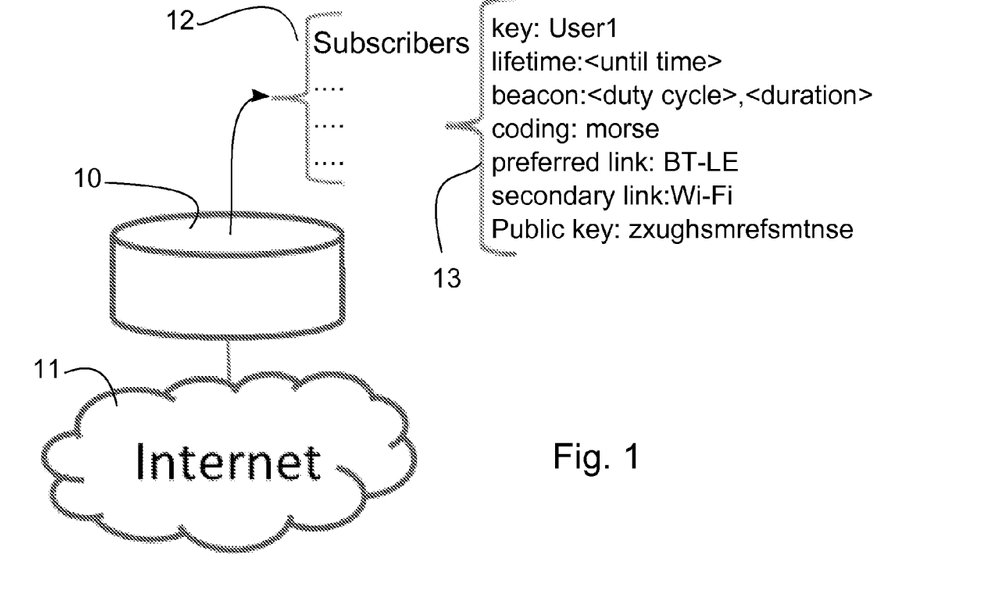
FIG. 1 shows an exemplary contact network service that may be used in the invention.

Referring to FIG. 1, an example of contact network service 10 is shown. The contact network may be a social network mostly intended for friends, like facebook etc., but it can also a corporate network or another closed user group with a central database. Such a closed user group can be created for customers of a shopping mall or office campus, where the enterprises advertise their "morse codes" in their social network profile for customers to use them for finding the stores (i.e., indoor location service) and possible offers. A central database included in the service 10 is hosting the contact profiles of the users. The backbone of the contact or social network is the internet 11, or any other computer interworking network capable of executing TCP/IP-like protocols and transmission.

The contact network service 10 has in its database a list 12 of subscribers, each of which may have an OTA (Over The Air) discovery package 13, which in a social network environment enables the detection of that user by his or her friends, as described in connection with FIG. 2. The key to the exemplary user is here User1, which is coded in the Morse code. The preferred radio communications network for local connectivity is here Bluetooth (BT-LE), but as a backup an alternative radio communications network (Wi-Fi) is also given, should the Bluetooth not be available in the location. The local communication link can be on Wi-Fi Direct, WLAN, Bluetooth or on LTE D2D, or on any other suitable telemetric technology available in the device. The technology choices the user makes in his or her profile depend of course on the devices used, the infrastructure of the environment and the preferences of the user.

Further information may consist of the time when the user User1 announces his or her availability for OTA contact attempts. This may for energy saving purposes be organized in beacon cycles. The beacon may use the time of day as a common reference for all users, and define a repetitive start time of an active beacon duty cycle and the duration of the cycle. With such an information exchange (e.g. during earlier communications between the parties), the discovering device knows in advance when to contact User1 and may set the discovery parameters for User1 to be most power and time optimized.

The OTA package is added to social network profiles to make the service support for the over-the-air discovery. The profile information may include a current discovery state of the user, i.e. either the user is discoverable or not discoverable. Other status states may exist depending on the user's configuration and preferences. E.g. if user has different groups of friends, or belongs to different communities, then the state may refer to limited discovery where the user is only discoverable by certain group(s). Whenever the user switches on or off his local link beacon, an application running in the device may be configured to update the discovery state in the profile accordingly. Also the amount and details of the information disclosed in the OTA discovery package 13 may vary between groups and full details can be made available to friends only. This depends on the settings available in the contact or social network.

Figure 2:
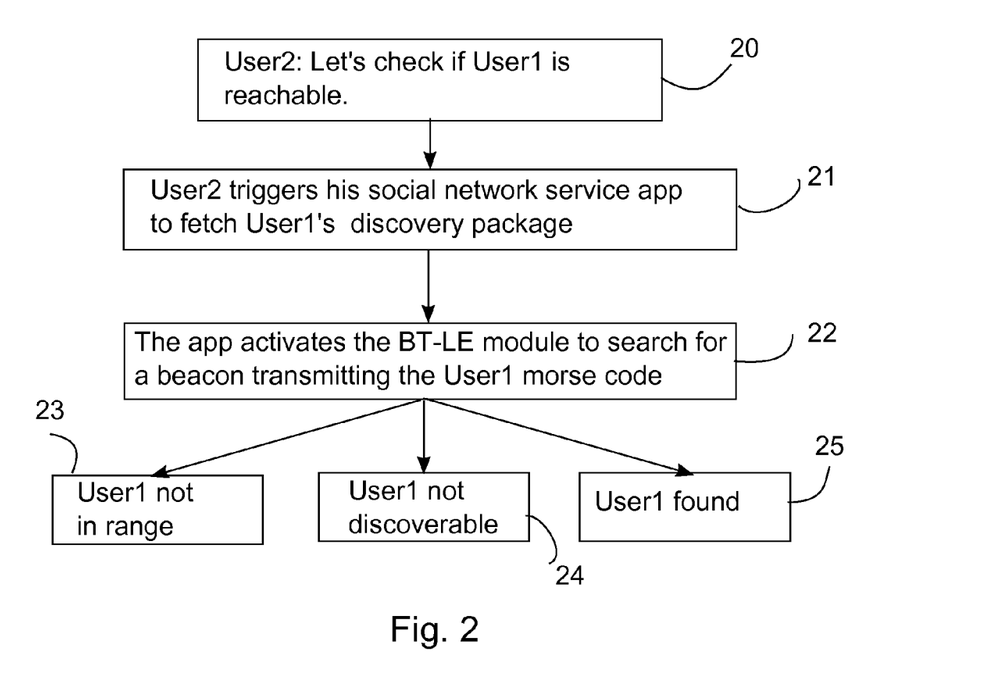
FIG. 2 shows a communication establishment attempt where a user is searching for another user.

Reference is now made to FIG. 2, where an inventive communication establishment attempt is described by means of a simplified workflow. The listening User2 wants at 20 to check whether his/her friend User1 is available for a chat. User2 triggers his social network service application ("app") in his mobile device at 21 to fetch the OTA discovery package 13 of User1. The information in a user's profile that is related to his discovery is referred to as a discovery package. At 22, the app activates the BT-LE module of the mobile device to search for a beacon transmitting the User1's Morse code. If User1 is transmitting, he or she is found at 25. If User1 is not transmitting or is not in the range of the preferred radio communications networks at 23, User1 is not found. If User1 is declining contact for the moment, he or she is also not discoverable at 24.

In more detail, the listening User2 scans with his device over one (or more) radio communications networks for morse signatures. User2 checks the received morse signatures against his social network records, for which purpose he is logged in to his social network. User2 finds that one of his friends (User1) uses e.g. the morse name XYZ, and fetches the public key for the User1 from his social network (e.g. facebook). User2 then sends a connection establishment request to User1 which is signed using the public key of User1. User1 then may validate this connection establishment request with his private key. In order to avoid a man-in-the middle attack, User1 may also validate the answer to his friend User2 with the public key of User2.

The encryption keys may be used as above to secure the communication link between the two devices. Alternatively, it can also be used only for an initial first authentication, and then the devices may directly exchange a secure key e.g. by a Diffie-Hellmann key exchange protocol or other similar means.

Any user may advertise the Morse code to his friends or a selected group of such, and the friends have then the code directly available. The code may be temporary and expire automatically at a set time, e.g. in order to avoid the user being subject to tracing and/or the social network account to malicious hacking. A new temporary Morse code need to be updated in the social network, and can then be fetched by the friends. A user may also cache the Morse codes of his friends in the memory of his device including any code expiry information, to avoid frequent network set-ups to check already found codes. Thereby only new or renewed codes need to be checked.

In another embodiment, User2 may first check the code and then make the local connectivity receiver of his device only to discover selected codes. With this approach, detected Morse codes other than those cached in memory are ignored. In practice, this may be done by storing the codes for a number of contacts in advance in the memory of the device, whereby only stored codes are checked for a match against the personal network contacts of User2.

Figure 3:
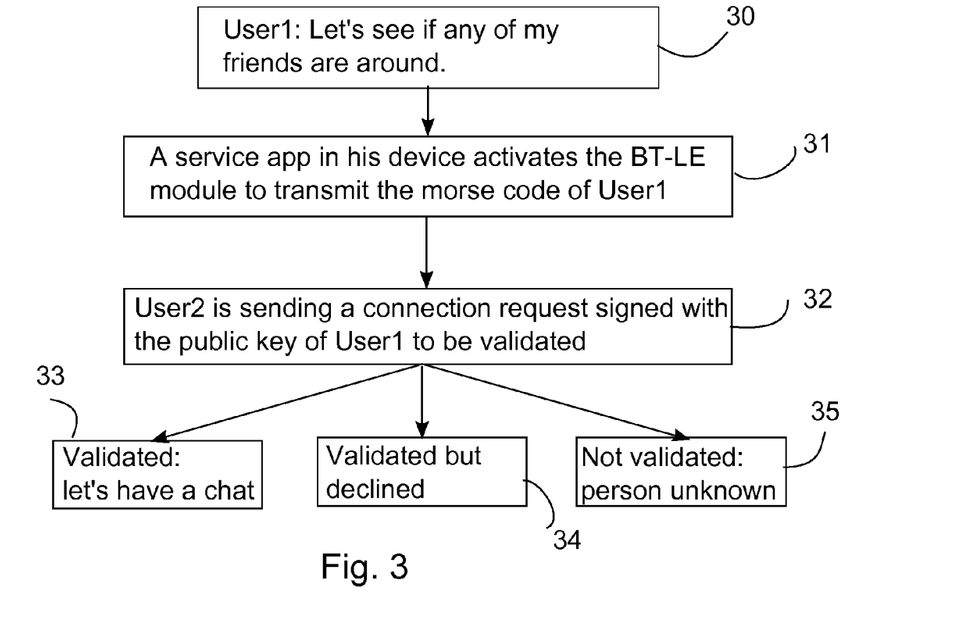
FIG. 3 shows a communication establishment attempt where a user decides wants to check to see if any of his friends are around.

Referring now to FIG. 3, a reverse situation from a perspective of User1 is explained where the transmitting User1 decides at 30 to check if any of his friends are around. He runs a service application (app) in his device at 31 that activates the BT-LE module of the device to transmit his Morse code XYZ. Listening User2 is in the neighborhood and is responding in 32 by sending a connection request signed with the public key of User1 to be validated by the same. User 1 now has the options to validate the code and take any action 33, 34 with the identified User 2, or to not validate the public key with his private key at 35, as User2 is not known to him.

Figure 4:
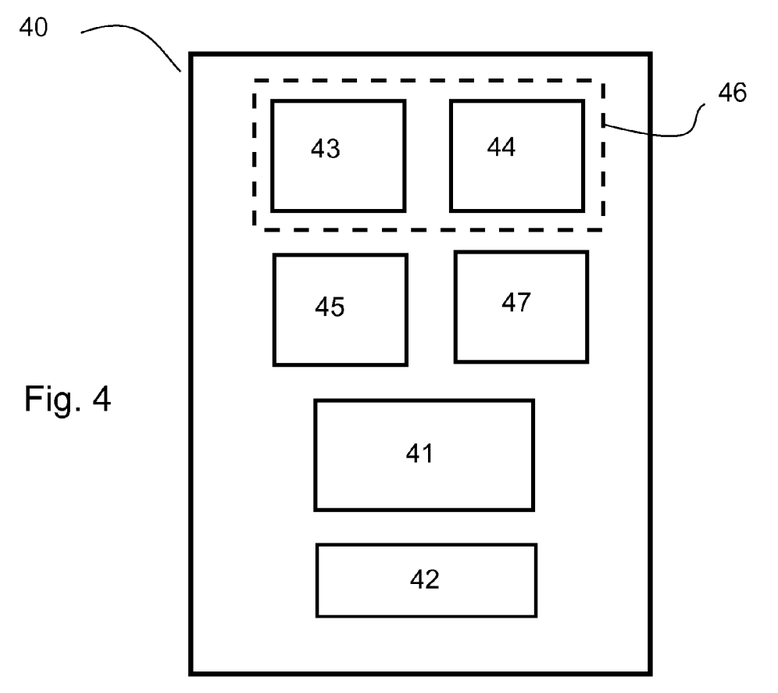
FIG. 4 illustrates an example apparatus capable of supporting at least some embodiments of the present invention.

FIG. 4 illustrates an example apparatus capable of supporting at least some embodiments of the present invention. Illustrated is device 40, which may comprise, for example, a mobile communication device such as a smartphone. Comprised in device 40 is processor 41, which may comprise, for example, a single- or multi-core processor wherein a single-core processor comprises one processing core and a multi-core processor comprises more than one processing core. Processor 41 may comprise a Qualcomm Snapdragon 800 processor, for example. Processor 41 may comprise more than one processor. A processing core may comprise, for example, a Cortex-A8 processing core manufactured by Intel Corporation or a Brisbane processing core produced by Advanced Micro Devices Corporation. Processor 41 may comprise at least one application-specific integrated circuit, ASIC. Processor 41 may comprise at least one field-programmable gate array, FPGA. Processor 41 may be means for performing method steps in device 40. Processor 41 may be means for performing method steps in device 40. Processor 41 may be configured, at least in part by computer instructions, to perform actions.

The device 40 may include a separate memory unit 42, which may comprise a random-access memory and/or permanent memory. Memory 42 may comprise at least one RAM chip. Memory 42 may comprise magnetic, optical and/or holographic memory, for example. Memory 42 is at least in part accessible to processor 41 and may at least partly be a storage of computer instructions that processor 41 is configured to execute. When computer instructions configured to cause processor 41 to perform certain actions are stored in memory 42, and device 40 overall is configured to run under the direction of processor 41 using computer instructions from memory 42, processor 41 and/or its at least one processing core may be considered to be configured to perform said certain actions.

The device 40 has a transceiver unit 46, which comprise a transmitter 43 and a receiver 44. Transmitter 43 and receiver 44 are configured to transmit and receive, respectively, information in accordance with at least one cellular or non-cellular standard. Transmitter 43 may comprise more than one transmitter. Receiver 44 may comprise more than one receiver. Transmitter 43 and/or receiver 44 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 40 also comprises a short range radio communication transceiver 45. The transceiver 45 supports at least one such technology, such as Bluetooth, WLAN, Wi-Fi Direct, LTE D2D, Wibree or similar technologies.

The device 40 typically comprises a user interface, not shown. A user interface (UI) may comprise at least one of a display, a keyboard, a touchscreen, a vibrator arranged to signal to a user by causing device 40 to vibrate, a speaker and a microphone. A user is able to operate device 40 via UI, for example to accept incoming telephone calls, to originate telephone calls or video calls, to browse the Internet, to manage digital files stored in memory 42 or on a cloud accessible via transmitter 43 and receiver 44, or via NFC transceiver 45, and/or to play games.

The device 40 may also be arranged to accept a user identity module (not shown), such as a subscriber identity module (SIM) card installable in device 40. The device 40 may comprise further devices not illustrated in FIG. 4, such as at least one digital camera.

The processor 41 may be furnished with a transmitter arranged to output information from processor 41, via electrical leads internal to device 40, to other devices comprised in device 40. Such a transmitter may comprise a serial bus transmitter arranged to, for example, output information via at least one electrical lead to memory 42 for storage therein. Alternatively to a serial bus, the transmitter may comprise a parallel bus transmitter. Likewise processor 41 may comprise a receiver arranged to receive information in processor 41, via electrical leads internal to device 40, from other devices comprised in device 40. Such a receiver may comprise a serial bus receiver arranged, for example, to receive information via at least one electrical lead from receiver 44 for processing in processor 41. Alternatively to a serial bus, the receiver may comprise a parallel bus receiver.

Processor 41, memory 42, transmitter 43, receiver 44, the transceiver 45, and/or any other modules or devices may be interconnected by electrical leads internal to device 40 in a multitude of different ways. For example, each of the aforementioned devices may be separately connected to a master bus internal to device 40, to allow for the devices to exchange information. However, as the skilled person will appreciate, this is only one example and depending on the embodiment various ways of interconnecting at least two of the aforementioned devices may be selected without departing from the scope of the present invention.

First, the user needs to install an application layer software application 47 (an "app") into the communication device 40 of FIG. 4. The app 47 resides of course physically in the memory unit 42 and is run in the processor 41, but is depicted in FIG. 4 for clarity. The app 47, which may be a computer program in the form of an API, has the right to control the local radio communication transceiver module 45 of the device, e.g. by switching its transmitter, sending a L1 carrier signal, on and off. When a user want to be discoverable to his friends, at least the transmitter part of the local radio communication transceiver module 45 needs to terminate all other tasks, after which the app 47 starts switching the transmitter on and off according to a predetermined pattern of sequences. In the case of a Morse code, the sequence for the code "user1" may be as follows: short off-on-short off-on-long off/short off-on-short off-on-short off/short off/short off-on-long off-on-short off/short off-on-long off-on-long off-on-long off-on-long off/.

In this sequence, short off=dot; long off=dash; on=separator. A different separator need to be in place between the letters, here the slash "/" above can be replaced by a "long on" or a "very long off".

With L1 is here meant the physical layer of the local radio communications network being used; all network technologies and protocols have their own standardized layers, and is not in the scope of the present invention to present these in any detail. For example, the Open Systems Interconnection model (OSI) characterizes and standardizes the internal functions of a communication system by partitioning it into abstraction layers. The model is a product of the Open Systems Interconnection project at the International Organization for Standardization (ISO), maintained by the identification ISO/IEC 7498-1.

The software application using the devices according to the invention need to have access to the physical layer L1 of the network used, but it is within the capacity of one skilled in the art to design software that can manipulate the various layers of a network protocol in order for it to serve the purpose of the SW application in question.

Obviously it lies within the scope of the invention to be able to use other variants for coding such physical layer L1 communication, e.g. where an "off" is the separator mark, and the length of the "on" sequence correspond to either a dot or a dash. Also other sequence codes than Morse code may be equally useful, as in fact the user of the device may not need to know what code is used himself A user may need only to type a desired alphanumeric code name that will then be translated into a Morse or some other code.

In another more advanced embodiment, the Morse code or some other type of sequential code may be used to modulate the L1 carrier to a simple PCM code where the dots, dashes and separators would have their own codeword. This would potentially be more power efficient than switching the carrier wave on and off, but would on the other hand require more advanced inter-layer communication in the mobile device.

It is to be understood that the embodiments of the invention disclosed are not limited to the particular systems, process steps, or components disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, components, and/or systems may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components, systems, etc. In other instances, well-known structures or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method of communication between devices, comprising the steps of:
   controlling, in a first device, a transmitter module operable to transmit a sequence of radio signal pulses representing a predetermined code across a local radio communications network;
   scanning, in at least one second device, by a receiver module to detect said predetermined code in said local radio communications network;
   accessing, with said at least one second device, a contact network of the user of said at least one second device in response to detecting the sequence of radio signal pulses from the local radio communications network;
   checking, in said at least one second device, said predetermined code against the user's contact network for a match stored in the network profiles for the contacts;
   fetching, by the at least one second device, at least a validation key related to a matching contact found in said contact network;
   sending over said local radio communications network, from said at least one second device, a connection establishment request using at least said validation key to said first device;

validating the origin of the connection establishment request in said first device in response to receiving the establishment request from the at least one second device.

2. A method according to claim 1, wherein the validation of said connection establishment request opens a direct communication channel between said first and second devices in a preferred communications network.

3. A method according to claim 1, wherein the contact network is a centralized service for personal information storage and distribution.

4. A method according to claim 1, wherein the local radio communications network is selected from one or more of the following: Bluetooth, a wireless local area network (WLAN), WiFi Direct, or long term evolution device to device (LTE) (D2D).

5. An apparatus comprising at least one processing core, at least one memory including computer program code and at least one communication transceiver module operable in at least one local radio communications network, the at least one memory and the computer program code being configured to, with the at least one processing core, cause the apparatus at least to:
controlling a radio transmitter in said transceiver module to transmit a sequence of radio signal pulses representing a predetermined code identifying a user of said apparatus over a local radio communications network to listening external devices;
receiving from at least one listening external device with a receiver in said transceiver module a connection establishment request containing a validation key from a user of said listening external device, wherein the validation key is related to the user profile of the user of said apparatus in a contact network of the user of said external device, and is matched by the at least one listening external device with said sent predetermined code;
validating the origin of said connection establishment request at the apparatus and opening a direct communications channel to said at least one listening external device in a preferred radio communications network in response to receiving the connection establishment request from the at least one listening external device.

6. An apparatus comprising at least one processing core, at least one memory including computer program code and at least one communication transceiver module operable in at least one local radio communications network, the at least one memory and the computer program code being configured to, with the at least one processing core, cause the apparatus at least to:
scanning with a receiver in said communication transceiver module over a local radio communications network for sequence of radio signal pulses representing a predetermined code;
receiving from at least one transmitting external device a sequence of radio signal pulses representing said predetermined code identifying a user of said transmitting external device;
matching the identity of said user encoded in said received predetermined code with a contact identity stored in said apparatus in a user profile of a contact network in response to detecting the sequence of radio signal pulses over the local radio communications network;
fetching a validation key related to said user of said transmitting external device and sending a connection establishment request to said transmitting external device using said validation key;
receiving a validation for said connection establishment request from said transmitting external device in response to receiving the connection establishment request and opening a direct communications channel to said transmitting external device in a preferred communications network.

7. An apparatus according to claim 6, wherein said sequence of radio signal pulses representing a predetermined code is a Morse code.

8. An apparatus according to claim 6, wherein the contact network is a centralized service for personal information storage and distribution.

9. An apparatus according to claim 6, wherein the local radio communications network is selected from one or more of the following: Bluetooth, a wireless local area network (WLAN), WiFi Direct, or long term evolution device to device (LTE) (D2D).

10. An apparatus according to claim 6, wherein the preferred communications network is the internet.

11. An apparatus according to claim 6, wherein the preferred communications network is a cellular network.

12. An apparatus according to claim 6, wherein the preferred communications network is one of the following: Bluetooth, a wireless local area network (WLAN), WiFi Direct, or long term evolution device to device (LTE) (D2D).

13. An apparatus according to claim 6, wherein said sequence of radio signal pulses representing a predetermined code is generated by altering the output signal of said transmitter between on and off states.

14. An apparatus according to claim 6, wherein said sequence of radio signal pulses representing
a predetermined code is generated by modulating the output signal of said transmitter to alternate between states as required by said predetermined code.

15. An apparatus according to claim 14, wherein the sequence of radio signal pulses are amplitude modulated.

16. An apparatus according to claim 14, wherein the sequence of radio signal pulses are frequency modulated.

17. An apparatus according to claim 6, wherein said sequence of radio signal pulses representing a predetermined code for said contacts are stored in advance in said at least one memory to restrict the matching of codes to only stored ones.

18. A non-transitory computer readable medium having stored thereon a set of computer readable instructions that, when executed by at least one processor, cause an apparatus to at least:
controlling a radio transmitter to transmit a sequence of radio signal pulses representing a predetermined code identifying a user of said apparatus over a local radio communications network to listening external devices;
receiving from at least one listening external device with a receiver a connection establishment request containing a validation key from a user of said listening external device, wherein the validation key is related to the user profile of the user of said apparatus in a contact network of the user of said listening external device, and is matched with said sent predetermined code;
validating the origin of said connection establishment request in response to receiving the establishment connection request from said listening external device and opening a direct communications channel to said at least one listening external device in a preferred radio communications network.

19. A non-transitory computer readable medium having stored thereon a set of computer readable instructions that, when executed by at least one processor, cause an apparatus to at least:
- scanning with a receiver over a local radio communications network for sequence of radio signal pulses representing a predetermined code;
- receiving from at least one transmitting external device a sequence of radio signal pulses from the local radio communications network representing said predetermined code identifying a user of said transmitting external device;
- matching the identity of a user encoded in said received predetermined code with a contact identity stored in said apparatus in a user profile of a contact network in response to detecting the sequence of radio signal pulses over the local radio communications network;
- fetching a validation key related to said user of said transmitting external device and sending a connection establishment request to said transmitting external device using said validation key;
- receiving a validation for said connection establishment request from said transmitting external device and opening a direct communications channel to said transmitting external device in a preferred communications network.

* * * * *